(12) United States Patent
Stone

(10) Patent No.: US 6,747,550 B2
(45) Date of Patent: Jun. 8, 2004

(54) LEG POSITION INDICATOR FOR BRAKING

(76) Inventor: Paul A. Stone, 1116 Downs Dr., Silver Spring, MD (US) 20904

(*) Notice: Subject to any disclaimer, the term of this patent is extended or adjusted under 35 U.S.C. 154(b) by 0 days.

(21) Appl. No.: 10/244,014

(22) Filed: Sep. 16, 2002

(65) Prior Publication Data

US 2004/0051629 A1 Mar. 18, 2004

(51) Int. Cl.[7] .................................................. H04B 3/36
(52) U.S. Cl. ............................ 340/407.1; 340/426.32; 340/457
(58) Field of Search ......................... 340/407.1, 457, 340/461, 463, 465, 475, 457.3, 453, 426.32; 74/473.19, 473.2; 477/96; 180/320, 321, 333

(56) References Cited

U.S. PATENT DOCUMENTS

| | | | |
|---|---|---|---|
| 3,861,349 A | | 1/1975 | Conley ........................ 74/411.5 |
| 5,362,138 A | * | 11/1994 | Clemens et al. |
| 5,553,684 A | * | 9/1996 | Bolduc ........................ 180/333 |
| 6,078,860 A | * | 6/2000 | Kerns ........................... 701/93 |
| 6,406,102 B1 | | 6/2002 | Arnold ......................... 303/20 |
| 6,415,675 B1 | | 7/2002 | Schneider et al. .......... 116/205 |
| 6,442,472 B1 | * | 8/2002 | Vivek et al. ................ 701/110 |

* cited by examiner

*Primary Examiner*—Van Trieu
(74) *Attorney, Agent, or Firm*—David L. Banner

(57) ABSTRACT

A tactile feedback device such as a bumper or prod located to give the operator of a wheeled vehicle tactile feedback when the leg of the operator is in operable position to depress the brake pedal. Preferably, the feedback device is locatably adjustably fixed to the body of the vehicle in a location causing contact when the leg of the operator is in an ergonomically comfortable and ordinary position for depressing the brake. Illustratively, the device may depend from the steering column of a passenger automobile. In an alternative embodiment, the feedback device is readily removable from the vehicle. In a further alternative embodiment, contact characteristics may be adjusted to be, at one end of a range of adjustment a soft contact, at the other end of a range of adjustment a solid, unyielding contact, or any intermediate between the two ends of the range of adjustment.

15 Claims, 3 Drawing Sheets

LEG POSITION INDICATOR FOR BRAKING

BACKGROUND OF THE INVENTION

1. Field of the Invention

The present invention relates to an interface aspect of motor vehicle control systems. More particularly, it relates to a tactile indicator for indicating to the operator of a motor vehicle that his or her leg is positioned to operate the brake pedal.

2. Description of the Prior Art

Occasionally, automobiles have accelerated from a stop, quite unexpectedly to the operators. Vehicle malfunction has been found responsible in some cases, but in other cases, it is operator error. In the latter case, it is thought that operators of motor vehicles, particularly passenger automobiles, inadvertently apply pressure to the accelerator pedal instead of the brake pedal. This obviously entails potentially catastrophic consequences.

There exists a need for indicating to an operator when his or her foot is in a position to operate the brake pedal of a motor vehicle.

SUMMARY OF THE INVENTION

The present invention solves the above problem by providing distinctive tactile feedback when the driver's foot is placed on the brake pedal but not when it is placed elsewhere, particularly on the accelerator pedal. Tactile feedback is accomplished by positioning an object such that it will be contacted and sensed by the operator's leg in the course of applying the brake pedal, but not otherwise. Because the brake is used many times in ordinary driving, the operator will become conditioned to the tactile stimulation. In most situations calling for the brakes to be applied, the operator will consciously or unconsciously be aware of whether his or her foot is appropriately located to operate the brake pedal of a vehicle.

Accordingly, it is one object of the invention to provide tactile feedback to the operator of a motor vehicle that his or her foot is appropriately located for operating the brake.

It is another object of the invention to provide subconscious guidance of the operator of a vehicle in placing his or her foot in proximity to a brake pedal of the vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
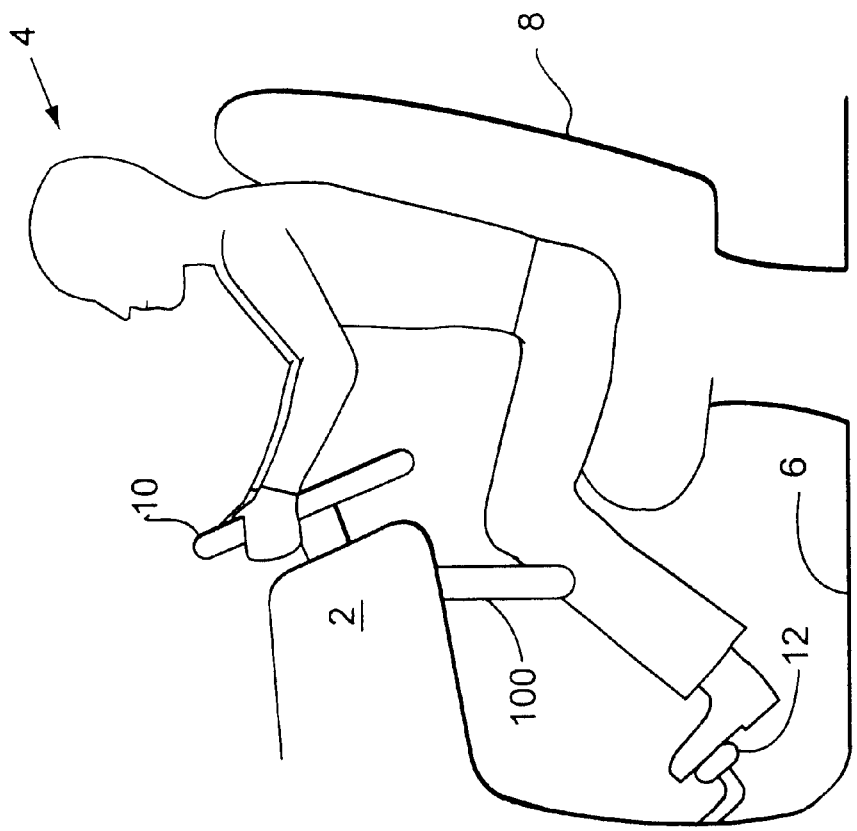
FIG. 1 is a diagrammatic, environmental side elevational view of one embodiment of the invention.

FIG. 1 of the drawings shows a portion of the interior of a wheeled vehicle such as a passenger automobile. The vehicle has a body, represented by dashboard 2. The body will be understood to encompass at least that structural portion of the vehicle which supports significant components of the vehicle and which in most vehicles encloses a human operator 4. The wheeled vehicle will be understood to include conventional road engaging wheels (not shown) rotatably connected to the body either directly or indirectly through, for example, a suspension (not shown), and a conventional braking system (not shown in its entirety) including brakes which are disposed to brake the wheels. It will be appreciated that in a conventional braking system, brake operating pedal 12 activates the brakes to brake the road engaging wheels when brake operating pedal 12 is depressed.

As depicted, the body includes a floor 6 and a seat 8 mounted to the body at floor 6. Operator 4 is shown grasping a steering wheel 10 and engaging a brake pedal 12. Steering wheel 10 and brake pedal 12 are ultimately fixed to the body of the vehicle. Brake pedal 12 is an interface element which receives an input from the human operator. In the particular example of brake pedal 12, the foot of the human operator contacts and applies operative pressure to the conventional hydraulic circuit of the brake system. Brake pedal 12 is the only element of the brake system to be contacted or mechanically engaged and moved to exercise control of or operate the brake system. In other control devices (not shown), levers and other devices have corresponding interface elements which are manipulated by the human operator.

It will be seen that a projection 100 depends from dashboard 2 alongside the lower leg of operator 4. Projection 100 is fixed to the body of the vehicle in any suitable way, and serves as a tactile feedback member which is located, dimensioned, and configured to provide tactile feedback to operator 4 confirming that the body member of operator 4 which ordinarily depresses brake operating pedal 12, in this case the leg, is in fact in operative position to depress brake operating pedal 12. Tactile feedback is a consequence of contact of the leg of operator 4 with projection 100. It is important to the invention and to safe and intended operation of the vehicle that the tactile feedback member be different and distinct from the interface element of the operator control. It will be appreciated that contact with brake pedal 12 will signal that the foot of the operator is in operative position, but such contact does not assure in vehicles with a plurality of pedals in close proximity to one another that the intended pedal has been contacted. Provision of a tactile feedback member appropriately located with respect to one particular pedal or control device, as occurs in the present invention, assures that the operator know which control is about to be operated. The operator may then operate the control device or alternatively, adjust position of his or her foot to operate the intended pedal should the initial position have been inappropriate.

Figure 2:
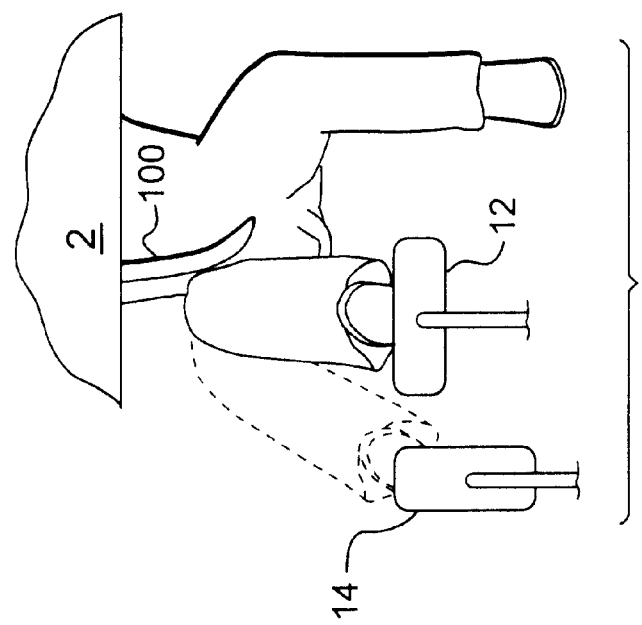
FIG. 2 is a diagrammatic, front elevational detail view of FIG. 1.

FIG. 2 shows contact between the leg of operator 4 and projection 100 when the foot of operator 4 is suitably located for operating brake operating pedal 12. It will be seen that this contact displaces projection 100 to the left of operator 4, which of course is to the right in FIG. 2 as depicted. It will further be seen that operator 4 need not make conscious effort to contact projection 100 due to location of the latter relative to brake operating pedal 12.

It will further be appreciated that when operator 4 moves his or her right leg to operate accelerator pedal 14, this being shown in broken lines in FIG. 2, the leg is out of contact with projection 100. In the embodiment of FIG. 2, projection 100 is flexible or resilient, thereby being disposed to yield responsive to body contact with operator 4, and will depend straight downwardly (this is not shown in FIG. 2) when the leg of operator 4 is moved out of engagement with brake pedal 12, as it would be to operate accelerator pedal 14.

Figure 3:
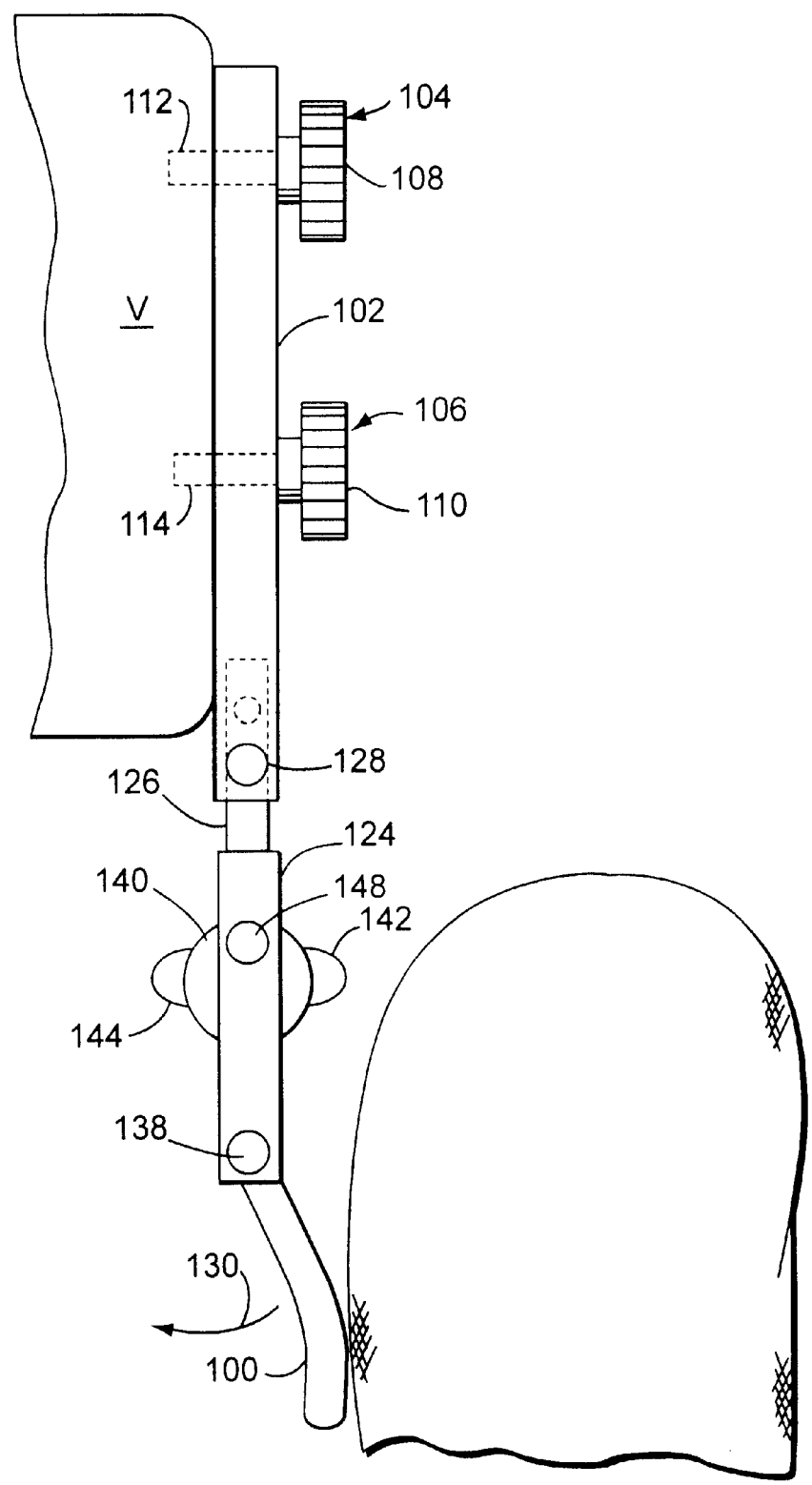
FIG. 3 is an environmental, front elevational view of one embodiment of the invention, drawn to enlarged scale.
Figure 4:
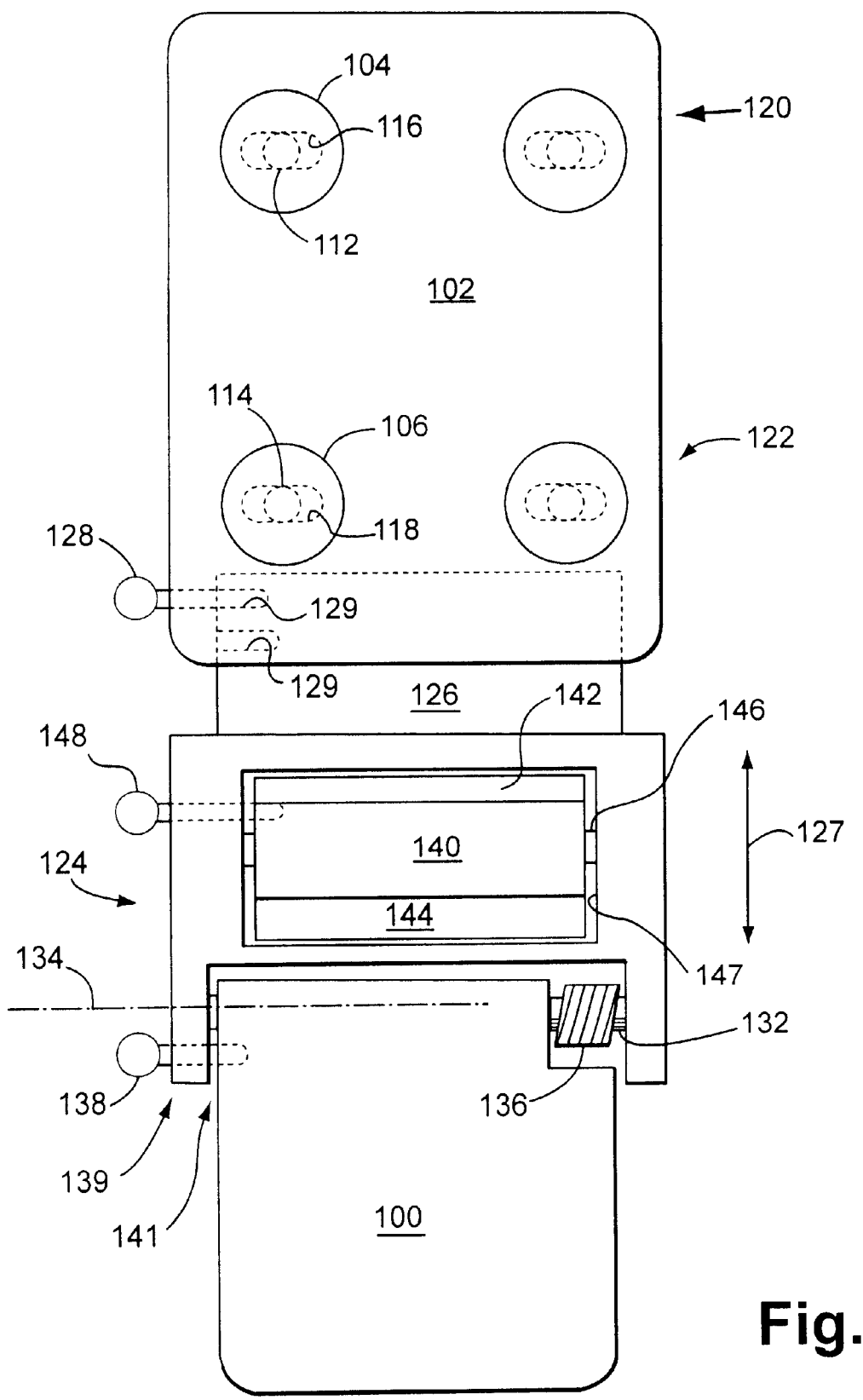
FIG. 4 is a side elevational view of the embodiment of FIG. 3.

FIGS. 3 and 4 show mounting and adjustment details of the invention. A base member 102 is suitably fixed to a part of the vehicle V, such as the dashboard, steering column, firewall, or other suitable structural part. Stepped setscrews 104, 106 having knurled heads 108, 110 and threaded shafts 112, 114 which engage respective threaded holes (not separately shown) formed in the structural part of the vehicle. Setscrews 104, 106 both removably and releasably mount the tactile feedback device to the vehicle and also serve as positional adjusters enabling lateral horizontal adjustment of position on the vehicle. As seen in FIG. 4, shafts 112 and 114 occupy horizontally extending slots 116, 118 formed in base member 102. If desired, these slots could be arranged to have vertical legs (not shown), so that vertical adjustment could be made utilizing setscrews 104, 106. Additional setscrews 120, 122 are also provided, and their arrangement is structurally similar to that of setscrews 104, 106.

Tactile feedback member 100 is adjustably fixed to base member 102 by the following arrangement. A support member 124 has a tongue 126 which is slidably insertable into base member 102. Tongue 126 is pinned in a selected position relative to base member 102 by a friction pin 128. Several different holes 129 for receiving pin 128 are provided in tongue 126 to enable different positions of vertical adjustment of tactile feedback member 100. The direction of vertical adjustment is indicated by arrow 127. Arrow 127 extends in a direction perpendicular to slots 116, 118 which provide horizontal adjustment.

Tactile feedback member 100 is pivotally mounted on support member 124, so that it can yield to body contact with the operator. In FIG. 3, the knee of the operator is shown almost in contact with feedback member 100. If contact ensues, feedback member 100 will pivot in the direction of arrow 130 if not restrained. Feedback member 100 is pivotally supported on an axle 132 having an axis of rotation 134. Preferably, a torsion spring 136 urges feedback member 100 in a direction counter to arrow 130. It will be understood that in the arrangement of torsion spring 136, one end (not shown) of spring 136 is anchored at feedback member 100, and the other end (not shown) is anchored at member 124.

If it is desired to immobilize feedback member 100 in place, then a pin 138 is employed. Pin 138 passes through a hole 139 formed in support member 124 and then into a hole 141 formed in feedback member 100. Installation of pin 138 secures feedback member 100 rigidly to support member 124 and ultimately rigidly to the vehicle.

A cylindrical member 140, rotatable on axle 146, is mounted, by the ends of axle 146, in a rectangular void or opening 147 penetrating support member 124. The cylindrical member 140 has on its surface a plurality of lobes (lobes 142, 144 are shown, but additional lobes may be provided), each extending for the full length of the cylindrical member 140. Each lobe 142 or 144 has a degree of hardness differing from that of every other lobe. Hard plastic, rubber, and diverse elastomeric foams may be utilized to form the lobes.

The function of the cylindrical member 140 is to signal proper positioning of the leg in one aspect or another, such as height above the brake pedal. Such indication is distinct from horizontal or azimuthal indication provided by projection 100. One or more of the lobes makes contact with the operator's leg, ordinarily the medial surface of the knee, as the operator's leg is lifted or is suspended preparatory to depressing the brake pedal. Cylindrical member 140 may be secured in any of a plurality of rotated positions by friction pin 148 so as to place and hold any selected lobe in a position of prominence relative to the operator's leg, thus making provision for a degree of intensity of tactile feedback as selected by the operator. Member 140 could be relocated to feedback member 100 if desired.

It will be appreciated that the invention may be applied to any vehicle and to any control which is mechanically moved by a human operator. For this purpose, the benefits of the present invention are not limited to foot operated pedals, but may be applied to levers and other controllers (none shown), including hand operated. Furthermore, the vehicle need not be wheeled, and the operator control need not be limited to controlling only the braking function. Any transport vehicle for transporting at least a human operator throughout an environment may incorporate the present invention. The transport vehicle, which may be a boat, ship, or aircraft, must have at least one movement component (such as, for example, a brake pedal) disposed to control a function of the transport vehicle such as, for example, movement throughout its environment, and at least one operator control for controlling the movement component. Of course the operator control is of a type which is mechanically engaged and moved by the human operator to exercise control of the movement component. The tactile feedback member is in all functional characteristics preferably but not necessarily in the form of feedback member 100 of FIGS. 1 and 2.

Although brakes are referred to in the plural, the invention would encompass a vehicle having a single brake regardless of the number of wheels provided and of the number of wheels which are braked by the single brake.

The alternative embodiments may be combined to provide any combination of respective effects as desired.

The invention may also be practiced by a device (not shown) which projects energy in order to accomplish tactile stimulation of the operator. Such a device could, for example, provide a mild electrical shock or other electromagnetic field which would be sensed by the operator, or which may project heat, or which may be significantly colder than the environment, or may impart vibrations to the operator. The tactile feedback device could supplement physical contact as well as supplant physical contact in order to provide tactile feedback.

It is to be understood that the present invention is not limited to the embodiments described above, but encompasses any and all embodiments within the scope of the following claims.

I claim:

1. In a vehicle having an operator control for controlling a function thereof by a human operator within said vehicle, and wherein said operator control is mechanically engaged and actuated by a body member of said human operator to exercise control of said function of said vehicle by engaging said operator control, the improvement comprising:

a tactile feedback member separate from said operator control, said tactile feedback member being located, dimensioned, and configured to provide tactile feedback to said body member of said human operator when contacted by said body member in the course of operating said operator control, whereby tactile feedback from said tactile feedback member confirms to said human operator that said body member which ordinarily engages said operator control is, in fact, in operative position to engage and actuate said operator control.

2. The tactile feedback member as recited in claim 1, wherein said tactile feedback member is attached to said vehicle.

3. The tactile feedback member as recited in claim 1, further comprising means for removably attaching said tactile feedback member to said vehicle.

4. The tactile feedback member as recited in claim 1, wherein said means for removably attaching said tactile feedback member to said vehicle further comprises means for positionally adjusting said tactile feedback member relative to said vehicle.

5. The tactile feedback member as recited in claim 1, wherein said tactile feedback member is disposed to yield responsive to contact with said body member of said operator.

6. The tactile feedback member as recited in claim 1, wherein said tactile feedback is substantially rigid.

7. The tactile feedback member as recited in claim 1, further comprising a contact characteristics adjuster disposed to adjust sensible characteristics caused by contact between said body member of said operator and said tactile feedback member, said sensible characteristic being adjustable in a substantially continuous range between soft contact and a solid unyielding contact.

8. The tactile feedback member as recited in claim 1, wherein said operator control comprises a brake actuating pedal and said body member of said human operator comprises a leg and foot, said feedback member providing tactile feedback to said leg thereby confirming to said human operator that said leg and foot is, in fact, in operative position to engage and actuate only said brake actuating pedal.

9. In a wheeled vehicle having a body, wheels rotatably connected to said vehicle body, a brake system having brakes disposed to brake said wheels, and a brake operating pedal which activates said brakes to brake said wheels when said brake operating pedal is depressed; the improvement comprising: a tactile feedback member separate from said braking system and fixed to said vehicle body, said tactile feedback member being located, dimensioned, and configured to provide tactile feedback to a leg of an operator of said wheeled vehicle, and when contacted thereby, confirming by tactile feedback that the leg the operator which ordinarily depresses said brake operating pedal is, in fact, in operative position to depress said brake operating pedal.

10. The wheeled vehicle according to claim 9, further comprising a removable mounting element operably connected to said tactile feedback member selectively to fix said tactile feedback member to said vehicle body and to release said tactile feedback member from said vehicle body.

11. The wheeled vehicle according to claim 9, further comprising a positional adjuster disposed to adjust operable location of said tactile feedback member relative to said vehicle body.

12. The wheeled vehicle according to claim 9, wherein said tactile feedback member is disposed to yield to contact with said leg of said operator.

13. The wheeled vehicle according to claim 12, further comprising a contact characteristics adjuster disposed to adjust sensible characteristics caused by contact between the operator of said wheeled vehicle and said tactile feedback member between soft contact and a solid unyielding contact.

14. The wheeled vehicle according to claim 13, wherein said contact characteristics adjuster is disposed to adjust sensible characteristics caused by contact between the operator of said wheeled vehicle and said tactile feedback member to at least one intermediate value between soft contact and a solid unyielding contact.

15. The wheeled vehicle according to claim 9, wherein said tactile feedback member is rigid.

* * * * *